United States Patent
Sun et al.

(10) Patent No.: US 9,764,469 B1
(45) Date of Patent: Sep. 19, 2017

(54) GENERATING ROBOTIC TRAJECTORIES WITH MOTION HARMONICS

(71) Applicants: Yu Sun, Tampa, FL (US); Yuongqiang Huang, Tampa, FL (US)

(72) Inventors: Yu Sun, Tampa, FL (US); Yuongqiang Huang, Tampa, FL (US)

(73) Assignee: UNIVERSITY OF SOUTH FLORIDA, Tampa, FL (US)

( * ) Notice: Subject to any disclaimer, the term of this patent is extended or adjusted under 35 U.S.C. 154(b) by 424 days.

(21) Appl. No.: 14/568,755

(22) Filed: Dec. 12, 2014

Related U.S. Application Data

(60) Provisional application No. 61/915,803, filed on Dec. 13, 2013.

(51) Int. Cl.
*G05B 19/18* (2006.01)
*B25J 9/16* (2006.01)

(52) U.S. Cl.
CPC ................... *B25J 9/1664* (2013.01)

(58) Field of Classification Search
CPC .......................................... B25J 9/1664
USPC ................................. 700/245, 254
See application file for complete search history.

(56) References Cited

U.S. PATENT DOCUMENTS

| | | | | |
|---|---|---|---|---|
| 6,505,085 B1 * | 1/2003 | Tuttle | ..................... | B25J 9/1605 700/28 |
| 7,444,269 B2 * | 10/2008 | Drumheller | ........... | G06F 17/509 29/857 |
| 7,668,700 B2 * | 2/2010 | Erignac | ............... | G06F 17/5009 703/1 |
| 8,311,973 B1 * | 11/2012 | Zadeh | ...................... | G06N 7/02 706/62 |
| 8,786,675 B2 * | 7/2014 | Deering | ................... | G09G 3/02 348/36 |
| 8,842,876 B2 * | 9/2014 | Rhoads | .............. | G06K 9/00577 382/100 |

(Continued)

OTHER PUBLICATIONS

Argall et al., A Survey of Robot Learning from Demonstration, in Journal of Robotics and Autonomous Systems, vol. 57, issue 5. pp. 469-483 (May 2009).

(Continued)

*Primary Examiner* — Ronnie Mancho
(74) *Attorney, Agent, or Firm* — Thomas|Horstemeyer, LLP.

(57) ABSTRACT

Aspects of the generation of new robotic motion trajectories are described. In one embodiment, a new robot motion trajectory may be generated by gathering demonstrated motion trajectories, adapting the demonstrated motion trajectories into robot-reachable motion trajectories based on a joint space of a robot model, for example, and generating motion harmonics with reference to the motion trajectories. Further, one or more constraints may be specified for a new goal. The weights of the motion harmonics may then be searched to identify or generate a new motion trajectory for a robot, where the new motion minimizes discrepancy from the demonstrated motion trajectories and error due to the at least one constraint. In the new motion trajectory, the degree to which the constraints are satisfied may be tuned using a weight. According to the embodiments, new motion variants may be generated without the need to learn or review new demonstrated trajectories.

20 Claims, 13 Drawing Sheets

(56) References Cited

U.S. PATENT DOCUMENTS

| | | | |
|---|---|---|---|
| 9,159,140 B2* | 10/2015 | Hoof | G06T 7/2086 |
| 2007/0179685 A1* | 8/2007 | Milam | G01C 21/00 |
| | | | 701/3 |
| 2011/0278277 A1* | 11/2011 | Stork Genannt Wersborg | B23K 26/02 |
| | | | 219/209 |
| 2015/0095882 A1* | 4/2015 | Jaeger | G06F 8/34 |
| | | | 717/109 |
| 2015/0234477 A1* | 8/2015 | Abovitz | G06K 9/00671 |
| | | | 382/103 |

OTHER PUBLICATIONS

Wei et al., Physically Valid Statistical Models for Human Motion Generation, in Journal of ACM Transaction on Graphics, vol. 30, issue 3, no. 19 (May 2011).

Min et al., Interactive Generation of Human Animation with Deformable Motion Models, in Journal of ACM Transaction on Graphics, vol. 29, issue 1, no. 9 (Dec. 2009).

Safonova et al., Synthesizing Physically Realistic Human Motion in Low-dimensional Behavior specific Spaces, in Journal of ACM Transaction on Graphics, vol. 23, issue 3, pp. 514-521 (Aug. 2004).

Ormoneit et al., Representing Cyclic Human Motion Using Functional Analysis, in Journal of Image and Vision computing. vol. 23, issue 14, pp. 1264-1276 (Dec. 2005).

Min et al. Motion Graphs++: A Compact Generative Model for Semantic Motion Analysis and Synthesis, in Journal of ACM Transaction on Graphics, vol. 31, issue 6, no. 153, (Nov. 2012).

Arikan et al., Interactive Motion Generation from Examples, in Journal of ACM Transaction on Graphics, vol. 21, issue 3, pp. 483-490 (Jul. 2002).

Pastor et al., Towards Associative Skill Memories, on 2012 12th IEEE-RAS International Conference on Humanoid Robots (Humanoids), pp. 309-315 (Nov. 2012).

Pastor et al., Learning and Generalization of Motor Skills by Learning from Demonstration, Robotics and Automation, 2009, ICRA '09, IEEE International Conference on 12-17, pp. 763-768 (May 2009).

Kovar et al., Motion Graphs, in Proceeding SIGGRAPH '08. no. 51 (Aug. 2008)3.

Li et al., Motion Texture: A Two-level Statistical Model for Character Motion Synthesis, in Proceeding SIGGRAPH '02. vol. 21, issue 3, pp. 465-472 (Jul. 2002).

Safonova et al., Construction and Optimal Search of Interpolated Motion Graphs, in Proceeding SIGGRAPH '07. vol. 26, issue 3, no. 106 (Jul. 2007).

Aleotti et al., Arm Gesture Recognition and Humanoid Imitation Using Functional Principal Component Analysis, IROS 2013. pp. 3752-3758(Nov. 2013).

Lee et al., Interactive Control of Avatars Animated with Human Motion Data, Journal ACM Transactions on Graphics, vol. 21 issue 3, pp. 491-500 (Jul. 2002).

Brand et al., Style Machines, in Proceeding SIGGRAPH '00, pp. 183-192 (Jul. 2000).

Lau et al., Modeling Spatial and Temporal Variation in Motion Data, in Proceeding SIGGRAPH Asia '09. no. 171 16 (Dec. 2009).

Tanco et al., Realistic Synthesis of Novel Human Movement from a Database of Motion Capture Examples, in Proceeding HUMO '00. page 137 (Dec. 2000).

Chai et al., Constraint-based Motion Optimization Using a Statistical Dynamical Model, ACM Trans, Graph (Aug. 2007).

Guerra-Filho et al., The Human Motion Database, A Cognitive and Parametric Sampling of Human Motion, Image and Vision Computing, vol. 30, issue 3, pp. 251-261 (Mar. 2012).

Dai et al., Functional Analysis of Grasping Motion, IROS 2013. pp. 3507-3513 (Nov. 2013).

Ijspeert et al., Movement Imitation with Nonlinear Dynamical Systems in Humanoid Robots, ICRA 2002, pp. 1398-1403 (May 2002).

Myers et al., A Comparative Study of Several Dynamic Time-Warping Algorithms for Connected-Word Recognition, Bell System Technical Journal, vol. 60, issue 7, pp. 1389-1409 (Sep. 1981).

* cited by examiner

GENERATING ROBOTIC TRAJECTORIES WITH MOTION HARMONICS

CROSS-REFERENCE TO RELATED APPLICATIONS

This application claims the benefit of U.S. Provisional Application No. 61/915,803, filed Dec. 13, 2013, the entire contents of which are hereby incorporated herein by reference.

GOVERNMENT LICENSE RIGHTS

This invention was made with government support under Award Number 1421418, awarded by the National Science Foundation. The government has certain rights in the invention.

BACKGROUND

In robotics, robotic motion planning may include analyzing robotic movement, dividing it into certain tasks to reach a goal, and, in some cases, optimizing movement for performance or other criteria. To control the motion of a robot, some techniques seek to mimic demonstrated motions. For example, a robot may be directed to lift an item based on the demonstrated motion of a human performing the same task. In this way, the robot may be directed to perform some tasks with motion that appears to be similar to that performed by humans.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding, but not necessarily the same, parts throughout the several views.

DETAILED DESCRIPTION

Learning from demonstration is a technique used to teach a robot certain motions or tasks. In this context, the overall goal of teaching a robot should not be to replicate a task, however, but to convey the essence of the task to the robot, so that the task can be undertaken in a new environment with different constraints. According to the embodiments described herein, a robot may be instructed to move an object from position A to position B based on a set of demonstrated (e.g., human) motion trajectories. Afterwards, as a constraint, a wooden board or other obstacle may be placed where it would intersect the demonstrated motion trajectories. Using the approach described herein, the robot may generate a new motion trajectory that travels around the board rather than attempting to pass through it, while exhibiting new motion that mimics natural human movement. Because the new constraint has not been taught, by completing the task while satisfying that new constraint, the robot generates a new motion trajectory.

In the context outlined above, aspects and embodiments of generating robotic trajectories using motion harmonics are described herein. Generally, the motion generation algorithm described herein exploits the data reconstruction ability of functional principal component analysis (fPCA), accounts for constraints defined by a user or other environmental considerations, and uses an optimization technique to generate new robotic motions or trajectories. According to one aspect of the embodiments, the new robotic motions may be controllably adapted to balance the discrepancy from the demonstrated motion trajectories and the error due to the constraints based on a weighting factor.

Thus, the motion generation algorithm described herein constructs robotic trajectories based on motion harmonics and various constraints. The algorithm uses fPCA to generate the motion harmonics from human motion trajectories or robot-reachable motion trajectories. The algorithm then refers to the motion harmonics to identify a new motion trajectory that satisfies one or more constraints. Referencing demonstrated motion trajectories, the algorithm may be relied upon to obtain motion harmonics and generate new motion trajectories for various tasks. Further, as presented herein, the new motion trajectories are compared with motion generated using a linear-segment polynomial-blend approach, for reference.

Figure 1:
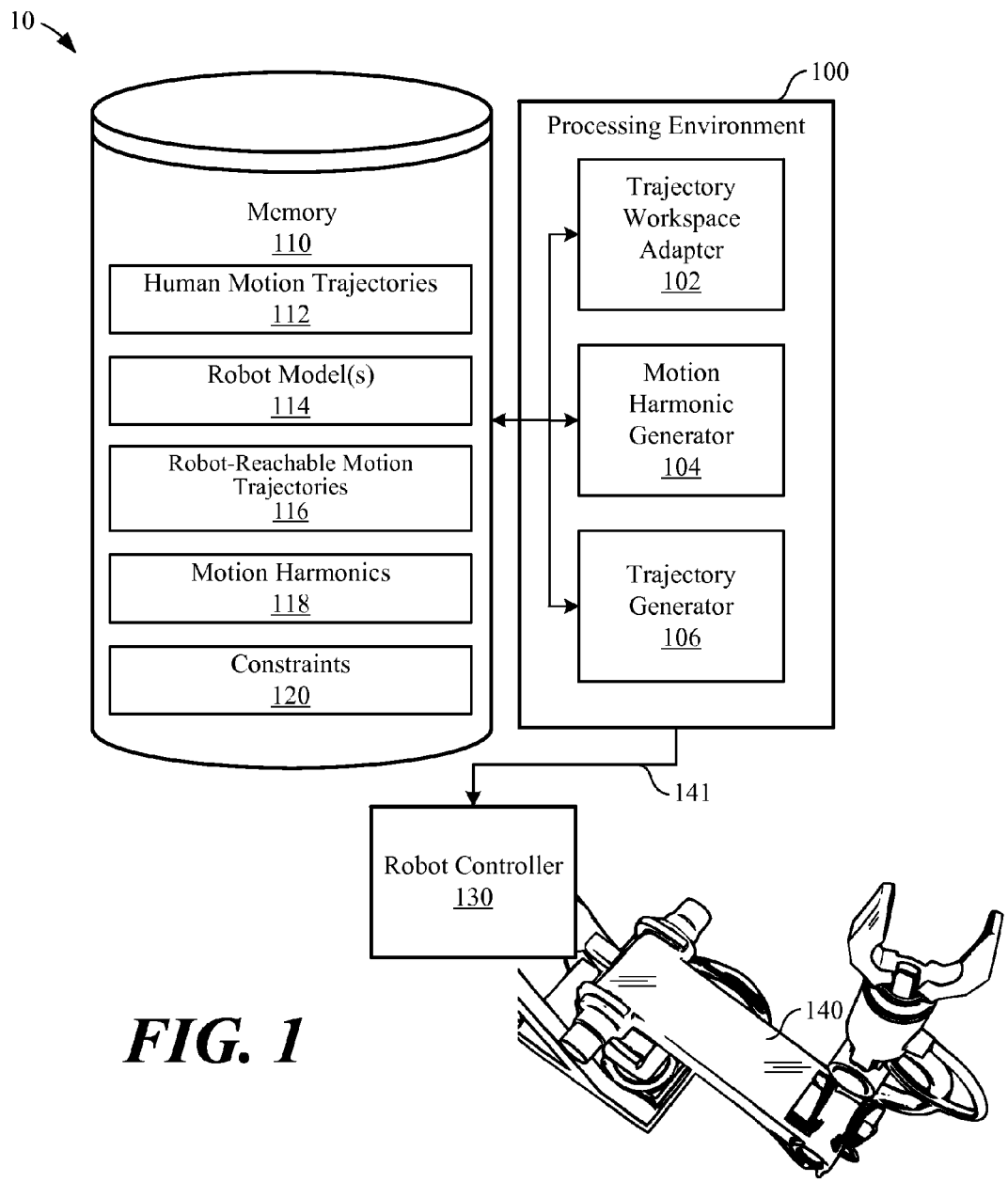
FIG. 1 illustrates a system for generating robotic trajectories with motion harmonics according to various embodiments of the present disclosure.

Turning to the figures, the embodiments are described in further detail. FIG. 1 illustrates a system 10 for generating robotic trajectories with motion harmonics according to various embodiments of the present disclosure. Among other elements, the system 10 includes a processing environment 100, a memory 110, a robot controller 130, and a robot 140. The processing environment 100 includes a trajectory workspace adapter 102, a motion harmonic generator 104, and a trajectory generator 106. The memory 110 stores various types of data referenced and/or processed by the processing environment 100, including but not limited to human motion trajectories 112, robot models 114, robot-reachable motion trajectories 116, motion harmonics 118, and constraints 120.

Figure 13:
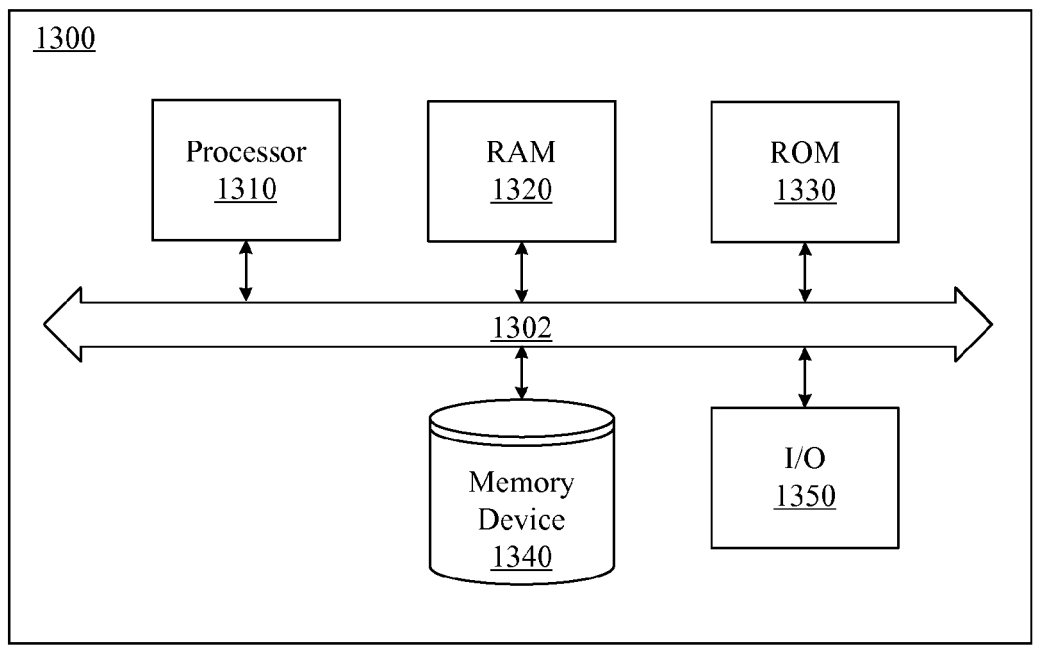
FIG. 13 illustrates an example schematic block diagram of a processing system 1300 that may be employed as the processing environment of the system in FIG. 1 according to various embodiments described herein.

In various embodiments, the processing environment 100 may be embodied as any general or specific purpose processor(s), processing circuit(s), and/or logic suitable to perform or execute the functions, procedures, and/or processes described herein. The memory 110 may be embodied as any suitable memory device suitable to store data. FIG. 13, which is described in further detail below, illustrates an example schematic block diagram of a processing system 1300 that may embody the processing environment 100 and/or the memory 110.

The human motion trajectories 112 include data points related to the motion trajectories exhibited by various individuals or humans when performing certain tasks. For example, the human motion trajectories 112 may include data points representative of head, arm, leg, hand, finger, or other body or body part movements. The human motion trajectories 112 may be gathered in any suitable manner and stored for later processing. As described in further detail below, the motion generation algorithm described herein is applied to reference human motion trajectories for 'beat,' 'hand over,' 'answer phone,' 'pull gun,' and 'punch' tasks.

The robot models 114 may include one or more data models representative of certain physical characteristics of the robot 140, among other robots. Because the extent of the motion in the human motion trajectories 112 may not lie completely within the workspace of the robot 140 (i.e., the configuration workspace of the robot 140), for example, the workspace trajectory adapter 102 is configured to adapt one or more of the human motion trajectories 112 from a first workspace (i.e., the workspace of a human) into one or more of the robot-reachable motion trajectories 116 in a second workspace (i.e., the configuration workspace of the robot 140). In this way, the motion exhibited in the reach of a human arm, for example, may be scaled to be commensurate with the reach of the robot 140, for example. When adapting a human motion trajectory 112 into a robot robot-reachable motion trajectory 116, the trajectory workspace adapter 102 may reference the robot models 114. The adaptation of the human motion trajectories 112 into the robot-reachable motion trajectories 116 is described in further detail below with reference to FIG. 2.

In the context described above, the robot models 114 may include data related to the configuration spaces of various robots. Among other data, the configuration spaces may outline positions reachable by an arm, clamp, or other mechanism of a robot, including the robot 140, in three-dimensional space. The robot models 114 may also include data related to kinematic constraints of the robot 140, among other constraints. In this context, the kinematic constraints may include rigid body constraints that define the available degrees of freedom (e.g., joints) of a rigid body system, velocity constraints, force constraints, etc. With regard to joints, the kinematic constraints may also define one more joint spaces or joint constraints depending upon the design of the robot 140 or other robots. Further, forward and/or inverse kinematics equations of the robot 140, stored in the robot models 114, may define mappings between rigid-body configuration and end-effector positions, or between the robot joint space and robot the configuration space. The processing environment 100 may reference the robot models 114 to determine which motion trajectories the robot 140 is capable of.

The motion harmonic generator 104 is configured to generate the motion harmonics 118 with reference to the human motion trajectories 112, the robot-reachable motion trajectories 116, or a combination of the human motion trajectories 112 and the robot-reachable motion trajectories 116. In one embodiment, the motion harmonic generator 104 may use fPCA to generate the motion harmonics 118. The generation of the motion harmonics 118 is described in further detail below with reference to FIG. 2.

The constraints 120 may include data related to one or more constraints to be taken into account by the trajectory generator 106 when generating a new motion trajectory 141 for the robot 140. In this context, the constraints 120 may specify one or more positions of physical barriers, one or more positions of end effectors (e.g., arm, clamp, etc. positions), one or more time constraints within a time range of a task, or other constraints. In some embodiments, certain constraints of the robot 140 may be defined in the robot models 114 and/or in the constraints 120. For example, joint space and/or velocity constraints of the robot 140, for example, may be defined in the robot models 114 and/or in the constraints 120.

When generating the new motion trajectory 141 for the robot 140, the trajectory generator 106 may reference both the motion harmonics 118 and the constraints 120. As described in further detail below, the trajectory generator 106 may search weights of the motion harmonics 118 to identify the new motion trajectory 141 for the robot 140, where the new motion trajectory 141 minimizes discrepancy from the human motion trajectories 112 (and/or the robot-reachable motion trajectories 116) and error due to at least one constraint defined in the constraints 120. The generation of the new motion trajectory 141 by the trajectory generator 106 is described in further detail below with reference to FIG. 2.

The robot controller 130 comprises processing circuit(s), drivers, etc. configured to control the movement and operation of the robot 140. Thus, the robot controller 130 receives the new motion trajectory 141 from the trajectory generator 106 and directs the robot 140 to move according to the instructions defined by the new motion trajectory 141. To provide a motion control feedback loop for the robot controller 130, the robot 140 may include various sensors, including but not limited to cameras, multi-dimensional camera arrays, infrared or thermal sensors, radar sensors, one or more micro- or nano-electromechanical system (NEMS or MEMS) or other accelerometers, gyroscopes, or orientation sensors.

It should be appreciated that the robot 140 illustrated in FIG. 1 is provided by way of representative example only. In other words, the motion generation algorithm described herein may be applied to the generation of new motion trajectories for any robot, and the robot 140 is not intended to be limited to any particular robot type, style, or design. In the example studies described below, an NAO H25 v3.3 robot, by Aldebaran of Paris, France, was relied upon, although the motion generation algorithm described herein may be relied upon to generate new motion trajectories for other robots.

Figure 2:
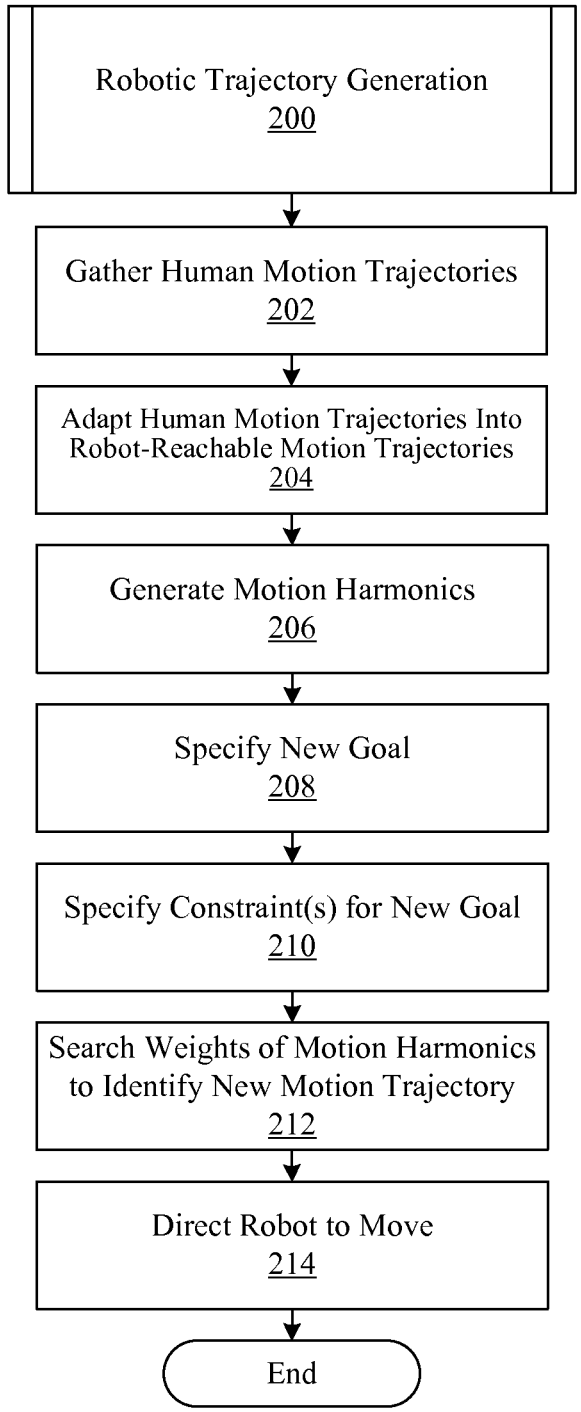
FIG. 2 illustrates an example flow diagram for a process of robotic trajectory generation performed by the system in FIG. 1 according to various embodiments of the present disclosure.

Before turning to FIG. 2 for a more detailed description of the operation of the system 10, it is noted that one or more of the processing environment 100, the memory 110, and the robot controller 130 may be located together with or apart from each other, in various embodiments. For example, the processing environment 100, the memory 110, and the robot controller 130 may be located together as integrated control circuitry (e.g., coupled together by a local bus) of the robot 140. Alternatively, one or more of the processing environment 100, the memory 110, and the robot controller 130 may be located apart from each other and communicatively coupled by a network.

FIG. 2 illustrates an example flow diagram for a process 200 of robotic trajectory generation performed by the system 10 in FIG. 1 according to various embodiments of the present disclosure. Although the process 200 is described in connection with the processing environment 100 (and the memory 110), other processing environments may perform the process 200 in FIG. 2. In certain aspects, the flowchart in FIG. 2 may be viewed as depicting an example group of steps performed by the system 10 according to one or more embodiments.

Figure 3:
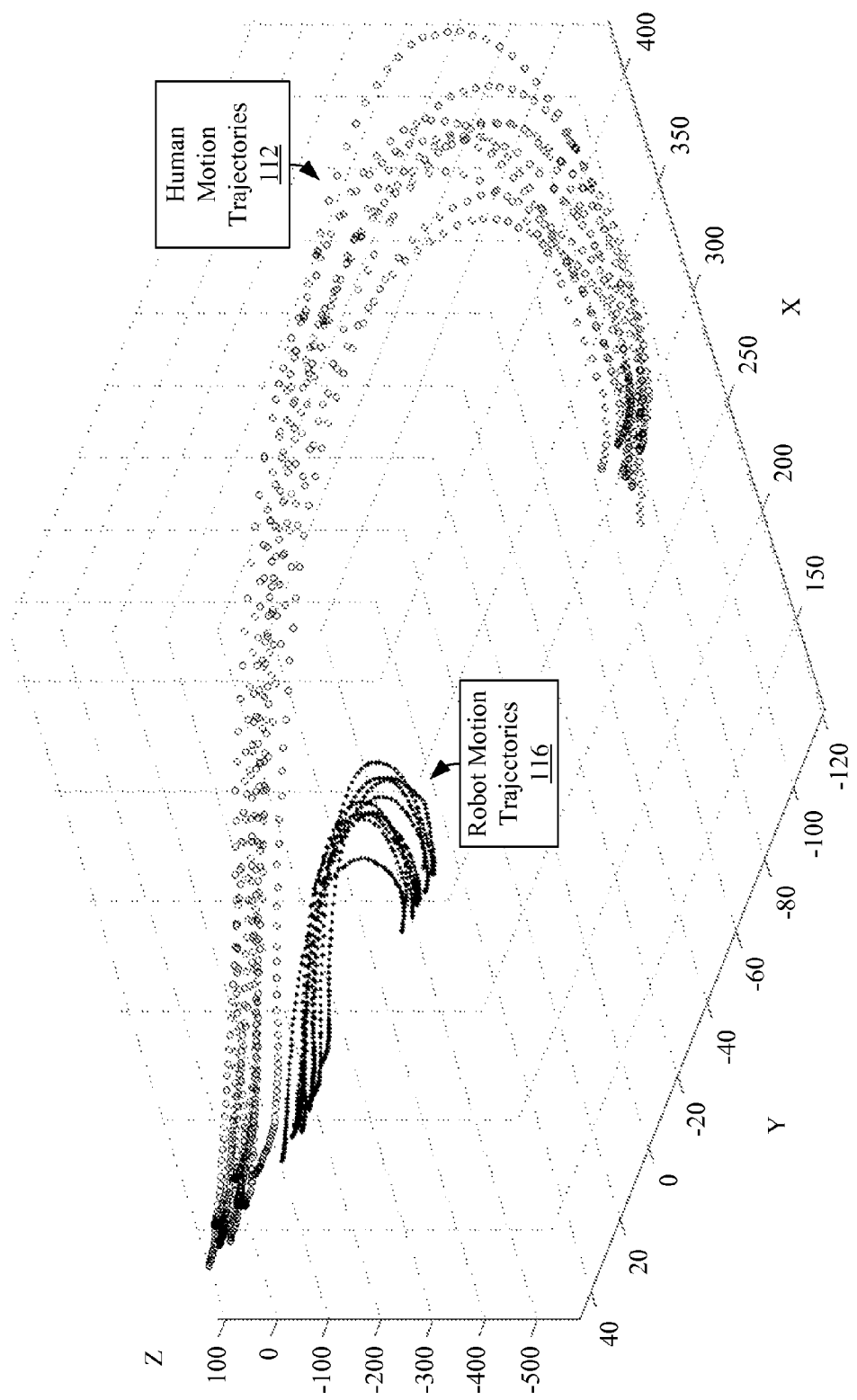
FIG. 3 illustrates an example motion trajectory adaptation result for an 'answer phone' task according to various embodiments of the present disclosure.

As illustrated in FIG. 2, the process 200 includes gathering human motion trajectories 112 in a first workspace at reference numeral 202. Here, the human motion trajectories 112 may be gathered by the processing environment 100 or another computing environment and stored in the memory 110. The human motion trajectories 112 may be captured in any suitable manner, such as using cameras, motion sensors, or other motion sensing systems. The human motion trajectories 112 may be captured at any time and stored for reference or later processing. Referring to FIG. 3 for example context, a set of human motion trajectories 112 for an 'answer phone' task is illustrated in three-dimensional space. In FIG. 3, the unit of measure along the x, y, and z coordinates of the three-dimensional space is millimeter, although the process 200 may be applied in other spatial dimensions and/or coordinate systems at any unit of measure.

At reference numeral 204, the process 200 includes adapting one or more of the human motion trajectories 112 from a first, human workspace into one or more robot-reachable motion trajectories 116 in a second, robot workspace. Referencing FIG. 3, the workspace trajectory adapter 102 (FIG. 1) may adapt one or more of the human motion trajectories 112 from a first, human workspace into one or more of the robot-reachable motion trajectories 116 in a second, robot workspace. The robot-reachable motion trajectories 116 may be stored in the memory 110.

The adaptation at reference numeral 204 is performed because, unless the robot 140 has a kinematic model similar to that of a human, computing trajectories for the workspace of the robot 140 using the human motion trajectories 112 may not yield a suitable solution. If the robot 140 is smaller than a human, for example, such as the case of the NAO robot, a significant portion of the human motion trajectories 112 will be unreachable by the robot 140. This problem is solved by the workspace trajectory adapter 102 by iteratively adapting the human motion trajectories 112 and performing inverse kinematics. It should be appreciated, however, that the adapting at reference numeral 204 may be omitted from the process 200 in certain cases. If the robot 140 has a kinematic model similar to that of a human, for example, then the adapting at reference numeral 204 may be omitted.

As illustrated in FIG. 3, the second workspace is smaller than the first workspace. This may be accounted for by the fact that the workspace or reach of a human arm, for example, may be greater than that of the robot 140. Thus, in FIG. 3, the human motion trajectories 112 are be scaled to be commensurate with the reach of the robot 140. When adapting the human motion trajectories 112 into the robot-reachable motion trajectories 116, the trajectory workspace adapter 102 may also reference the robot models 114.

Adapting the human motion trajectories 112 into the robot-reachable motion trajectories 116 may be performed according to the scaling algorithm described below. First, let $x^{(-1)}(t)$ be an original demonstrated human motion trajectory, and the initial value of scale s be:

$$s = \frac{\text{max reach of robot}}{\text{max reach of human}}. \quad (1)$$

Here, it can be assumed that $0<s<1$. Let $f(\cdot)$ represent forward kinematics (FK) and $f^{-1}(\cdot)$ represent inverse kinematics (IK), both of which may be stored in as part of the robot models 114. Further, $\Delta s$ may be defined as the update factor for s, err_min to be the minimum acceptable validity of the goal adapted trajectory, and nmax to be the maximum number of iterations for each value of s. The adaptation algorithm at reference numeral 204 takes each human motion trajectory $x^{(-1)}(t)$ as input and returns the inverse kinematics $q(t)=f^{-1}(x^{(n)}(t))$ whose forward kinematics approximate the adapted trajectory with an error of err≤err_min. An example pseudo code listing for the adaptation algorithm is provided in Table 1 below.

1: Input: $x^{-1}(t)$, s, $\Delta s$, err$_{min}$, nmax
2: err_old=+∞
3: n=0//iteration index
4: while err>err$_{min}$ and n<nmax do
5: if n==0 then
6: $x^0(t)=sx^{-1}(t)$//initialization
7: else
8: $x^n(t)=x^{(n-1)}(t)+d$
9: end if
10: $y(t)=f(f^{-1}(x(n)(t)))$
11: $t^*=\text{argmax}_t\|y(t)-x^{(n)}(t)\|$//find largest error
12: $d=y(t^*)-x^{(n)}(t^*)$//translation vector
13: err=$T^{-1}\Sigma_{t=1}^T\|y(t)-x^{(n)}(t)\|$
14: if err>err_old then
15: n=-1//scale in next iteration
16: s=s·$\Delta s$//scaling down
17: end if
18: n=n+1
19: err_old=err
20: end while
21: Output: $q=f^{-1}(x^{(n)}(t))$ Table 1: Adaptation Algorithm Pseudo Code Listing At reference numeral 206, the process 200 includes generating the motion harmonics 118 with reference to the robot-reachable motion trajectories 116. Particularly, at reference numeral 206, the motion harmonic generator 104 may generate the motion harmonics 118 with reference to the robot-reachable motion trajectories 116 using fPCA or another suitable analysis algorithm or technique. Further, at reference numeral 206, the motion harmonics generated by the motion harmonic generator 104 may be stored in the memory 110 as the motion harmonics 118. In other embodiments, the motion harmonics 118 may be generated with reference to the human motion trajectories 112 or a combination of the human motion trajectories 112 and the robot-reachable motion trajectories 116.

To generate the motion harmonics 118, a set of demonstrated motion trajectories (e.g., the human motion trajectories 112 and/or the robot-reachable motion trajectories 116) may considered trajectory functions $x_i(t)$, i=1, ..., N (N being the number of the functions). The functions $x_i(t)$ are first centered by subtracting the mean function $x_i(t)=x_i(t)-N^{-1}\Sigma_{i=1}^N x_i(t)$. $\theta(t)$ denotes the eigenfunction to be computed. The projection score of the function $x_i(t)$ on eigenfunction $\theta(t)$ may be computed as:

$$h_i(\theta(t))=\int x_i(t)\theta(t)dt. \quad (2)$$

Similar to using PCA, it is possible to find a $\theta(t)$ that maximizes its mean squared projection score as:

$$\theta(t) = \underset{\theta_*(t)}{\mathrm{argmax}} \frac{1}{N} \sum_{i=1}^{N} h_i(\theta^*(t))^2, \quad (3)$$

while being orthogonal to previously computed eigenfunctions and having a unity norm.

The covariance function in fPCA is defined as:

$$v(t, s) = \frac{1}{N} \sum_{i=1}^{N} x_i(t) x_i(s) \quad (4)$$

and the eigenfunction is determined by solving:

$$\int v(t,s)\theta(s)ds = \lambda \theta(t), \quad (5)$$

where $\lambda$ is the eigenvalue which corresponds to $\theta(t)$.

For multidimensional cases, fPCA needs a slight modification. In this context, let the data be $x_i(t) = \{x_i^d(t)\}$ (d=1, ..., D with D being the dimension), and let $\theta(t) = \{\theta^d(t)\}$. The score of $\theta(t)$ becomes:

$$h_i(\theta(t)) = \frac{1}{N} \sum_{i=1}^{N} x_i^d(t) x_i^l(s). \quad (6)$$

The covariance function becomes:

$$v^{kl}(t, s) = \frac{1}{N} \sum_{i=1}^{N} x_i^k(t) x_i^l(s), \quad (7)$$

and $\theta(t)$ is found by solving:

$$\sum_{d=1}^{D} \int v^{kd}(t, s) \theta^d(s) ds = \lambda \theta^k(t), k = 1, \ldots, D, \quad (8)$$

where $\lambda$ is the eigenvalue which $\theta(t) = \{\theta^k(t)\}$ all share.

It is noted that the computation of fPCA can be converted to matrix eigenanalysis, if the data (and the eigenfunction; basically all the functions) are represented with a set of defined basis functions such as Fourier and/or B-spline.

Before turning to reference numeral 208, it is noted that the processes at reference numerals 204 and 206 do not need to be performed for every motion trajectory 112 and/or 116 stored in the memory 110. For example, among a set of demonstrated human motion trajectories 112 for a task, it is not necessary in every embodiment for all the trajectories 112 to be adapted to robot-reachable motion trajectories 116 at reference numeral 204. Similarly, it is not necessary that, at reference numeral 206, the motion harmonic generator 104 generate the motion harmonics 118 with reference all the trajectories 112 and/or 116. Also, in some embodiments, the processes at reference numerals 204 and 206 (and others) may be swapped or switched in order. In this case, if the generation of the motion harmonics 118 occurs before the human motion trajectories 112 are adapted to the robot-reachable motion trajectories 116, then the motion harmonics 118 may be adjusted into the configuration or operating space of the robot 140, for example, after being generated.

At reference numeral 208, the process 200 includes specifying a new goal. The new goal may include any motion, including but not limited to the example 'beat,' 'hand over,' 'answer phone,' 'pull gun,' or 'punch' motions described herein. Further, at reference numeral 210, the process 200 includes specifying one or more constraints associated with the new goal. The one or more constraints may include physical constraints, kinematic constraints, time constraints, or other constraints and be stored as the constraints 120 in the memory 110, as described herein.

At reference numeral 212, the process 200 includes searching weights of the motion harmonics 118 to identify a new motion trajectory (e.g., reference numeral 141 in FIG. 1) that minimizes error due to the at least one constraint 120 specified at reference numeral 210 and discrepancy from the human motion trajectories 112 (and/or the robot-reachable motion trajectories 116). More particularly, the trajectory generator 106 (FIG. 1) may search weights of the motion harmonics 118 to identify the new motion trajectory 141 that minimizes error due to the at least one constraint 120 specified at reference numeral 210 and discrepancy from the human motion trajectories 112 (and/or the robot-reachable motion trajectories 116). As described herein, the new motion trajectory 141 represents motion that was not previously observed by or demonstrated to the system 10. Because the new motion trajectory 141 accounts for (e.g., avoids, satisfies, etc.) the constraints 120 specified at reference numeral 210, it represents a new motion. Once generated, the new motion trajectory 141 may be provided to the robot controller 130, as described below, and/or stored in the memory 110.

To perform a new task in a new environment for a new goal, for example, the one or more constraints 120 specified at reference numeral 210, denoted $e_s$ (s=1, ..., S, with S being the number of constraints), may be taken into consideration by the trajectory generator 106. As described above, in various cases, the one or more constraints 120 may specify one or more physical constraints, kinematic constraints, or time constraints, for example, or combinations thereof, such as end effector world-space position constraints at certain time instants $t_s$ within a time range [1, T] of a task. Typically, the demonstrated motions (e.g., the human motion trajectories 112) are not captured in the presence of the constraints 120 specified at reference numeral 210. In other words, when the human motion trajectories 112 were captured at reference numeral 202, the constraints 120 specified at reference numeral 210 were not present and did not impact the human motion trajectories 112.

To identify or generate the new motion trajectory 141 at reference numeral 212, let $q(t) = f^1(x(t))$ represent the new motion trajectory 141 in joint space converted from the world space. After fPCA, $q(t)$ can be represented by:

$$q(t, c) = q_0 + \sum_{l=1}^{L} c_l g_l(t), \quad (9)$$

where $q_0$ is the mean function, referred to as mean motion. Also, $g_l(t)$ is the l-th eigenfunction, l=1, ..., L, which referred to as motion harmonics. The weights $c_l$ of $g_l(t)$ differ with different tasks and, therefore, can be used to distinguish one task from another, and to create completely new tasks.

According to one aspect of the embodiments, the trajectory generator 106 may generate the new motion trajectory 141 as a balance between satisfying the constraints 120 specified at reference numeral 210 and maintaining motion representative of the demonstrated human motion trajectories 112 and/or the robot-reachable motion trajectories 116. Thus, according to one aspect of the embodiments, a weighting factor α is relied upon to balance discrepancy from the demonstrated motion trajectories with error due to the constraints 120 specified at reference numeral 210. That is, the trajectory generator 106 strikes a balance between meeting the constraints 120 and staying close to the demonstrated motion trajectories.

The new motion trajectory 141 may be generated by finding:

$$\hat{c} = \underset{c}{\mathrm{argmax}} \frac{1}{S} \sum_{s=1}^{S} \left\| e_s - f[q(t_s, c)] \right\|^2 + \frac{\alpha}{L} \left\| c - c_0 \right\|^2, \quad (10)$$

$$(l = 1, \ldots, L),$$

where $c_0$ is the mean score of the task. The objective function in Eqn. (10) consists of two parts. The first part seeks to satisfy the constraints 120, and the second part seeks to stay close to the mean. The weighting factor α determines which part is favored and by how much. In certain embodiments, the weighting factor α may be defined by a user or according to other system factors. A sufficiently large α directs the new motion trajectory 141 to be more representative of the demonstrated motion trajectories. In some cases, if the weighting factor α is too large, the new motion trajectory 141 may fail to meet one or more of the constraints 120. In contrast, a sufficiently small α prioritizes the one or more constraints 120, and new motion trajectory 141 may end up being far from the demonstrated motion trajectories.

Whatever the new motion trajectory 141, q(t, ĉ), it should be within the joint space of the robot 140, so that the robot 140 can physically perform it. Therefore, the following constraints 120 may be added in the configuration space:

$$q_l^d \leq q^d(t, \hat{c}) \leq q_u^d, \, d=1, \ldots, D, \quad (11)$$

where $q_l$ and $q_u$ are the lower and upper bound of the joint angles, respectively, for the d-th joint on the robot 140. Constraints of velocity and acceleration may be added in a similar way.

Eqns. (10) and (11) (along with any other possible constraints) pose a nonlinear programming problem. In one embodiment, the problem may be solved using a sequential quadratic programming (SQP) algorithm, although other algorithms may be relied upon. SQP iterates through the solution of a sequence of quadratic programming subproblems which approximates the original problem. SQP may be selected as relatively effective at solving optimization problems with a relatively high degree of nonlinearity.

After the new motion trajectory 141 is generated at reference numeral 212, the process 200 includes directing a robot to move according to the new motion trajectory 141 at reference numeral 214. For example, the trajectory generator 106 may communicate the new motion trajectory 141, in any suitable instructional form, to the robot controller 130. In turn, the robot controller 130 may direct the robot 140 to generate various movements according to the new motion trajectory 141, as described herein.

Turning to operating examples of the process 200 with representative data sets, human motion trajectories for the following five different tasks are evaluated: 'beat,' 'hand over,' 'answer phone,' 'pull gun,' and 'punch.' Among those tasks, demonstrated motions for the 'answer phone' and 'pull gun' tasks were performed by the same person, and the others were performed by different people. Each task was repeated a number of times, for a total of 63 repetitions/trials.

In the operating examples, an NAO H25 v3.3 robot was relied upon. The hand of the NAO robot was set as an end effector and the right arm was considered as a kinematics chain. Thus, the root joint for the human is "R_collar," and the root joint for the NAO robot is 'RShoulderPitch.' Three more joints are included for the NAO robot, including 'RshoulderRoll,' 'RElbowYaw,' and 'RElbowRoll.' Thus, the NAO robot has a degree of freedom (DOF) of four which limits the options of orientation when it reaches certain positions. As such, only (x, y, z) positional information is considered and, thus, each motion trial may be represented as a three-dimensional curve. The curves are not guaranteed to have the same length. Thus, the curves are aligned using dynamic time warping (DTW). For the NAO robot, the unit of length is millimeter.

The arm of NAO robot is shorter than that of human, and the curves are expected (and verified) to have some parts that are unreachable. To adapt the human motion trajectories 112 to the robot motion trajectories 114, the adaptation algorithm described herein (e.g., reference numeral 204 in FIG. 2), using the following scale relationship, was relied upon:

$$s = \frac{\text{arm length of NAO}}{\text{arm length of human}}. \quad (12)$$

The following parameters of the adaptation algorithm were also set: Δs=0.99 and err_min=0.1 (mm). The adaptation result example for the 'answer phone' task is shown in FIG. 3, as described above. Running statistics for the adaptation result are shown in Table 2 below, where 'apc' means 'average per curve.'

TABLE 2

Adaptation Result Statistics for 'Answer Phone' Task

| task | s | err (apc) | d (apc) | # iteration (apc) |
|---|---|---|---|---|
| beat | 0.3219 | 0.0084 | 0.1449 | 1.3000 |
| hand over | 0.2899 | 0.0000 | 0.0000 | 1.0000 |
| answer phone | 0.2897 | 0.0239 | 0.2645 | 2.0000 |
| pull gun | 0.2896 | 0.0080 | 0.1649 | 2.1667 |
| punch | 0.2935 | 0.0120 | 0.1011 | 2.6000 |

As to the generation of the motion harmonics 118, the fPCA was implemented using Matlab®, although other packages may be relied upon. 20 B-spline functions were used to represent the data and the motion harmonics. For generating the new motion trajectories, the motion harmonics were sampled and become $g \in R^{L \times T \times D}$, where L is the number of harmonics, T is the length of the aligned trajectories, and D=4 is the number of DOF in the kinematics chain. Also $c_l$ was normalized using mean μ and standard deviation σ obtained from the scores of the harmonics, and the joint space trajectory was obtained by:

$$q(c) = (\sigma c + \mu)g + q_0. \quad (13)$$

Thus, the new motion trajectories were generated by finding:

$$\hat{c} = \underset{c}{\operatorname{argmin}} S^{-1} \sum_{s=1}^{S} \|[f(q(c))]t_s - e_s\|^2 + \alpha L^{-1}\|c\|_f^2, \quad (14)$$

with the following constraints:

$$q_l^d \leq q[d, t] \leq q_u^d, t = 1 \ldots T, d = 1 \ldots 4 \text{ and} \quad (15)$$

$$q'^d_l \leq \frac{d}{dt} q'[d, t] \leq q'^d_u, t = 1 \ldots T, d = 1 \ldots 4, \quad (15)$$

where $\|\cdot\|_f$ is the Frobenius norm and $q[d, t]$ is the value of q in the d-th joint at time index t. Additionally, d/dt q' is the finite difference matrix of q with respect to the time indices, which estimates q's velocity. Finally, $q'^d_l$ and $q'^d_u$, are the lower and upper bounds of velocity, respectively, obtained from the data.

Figure 4:
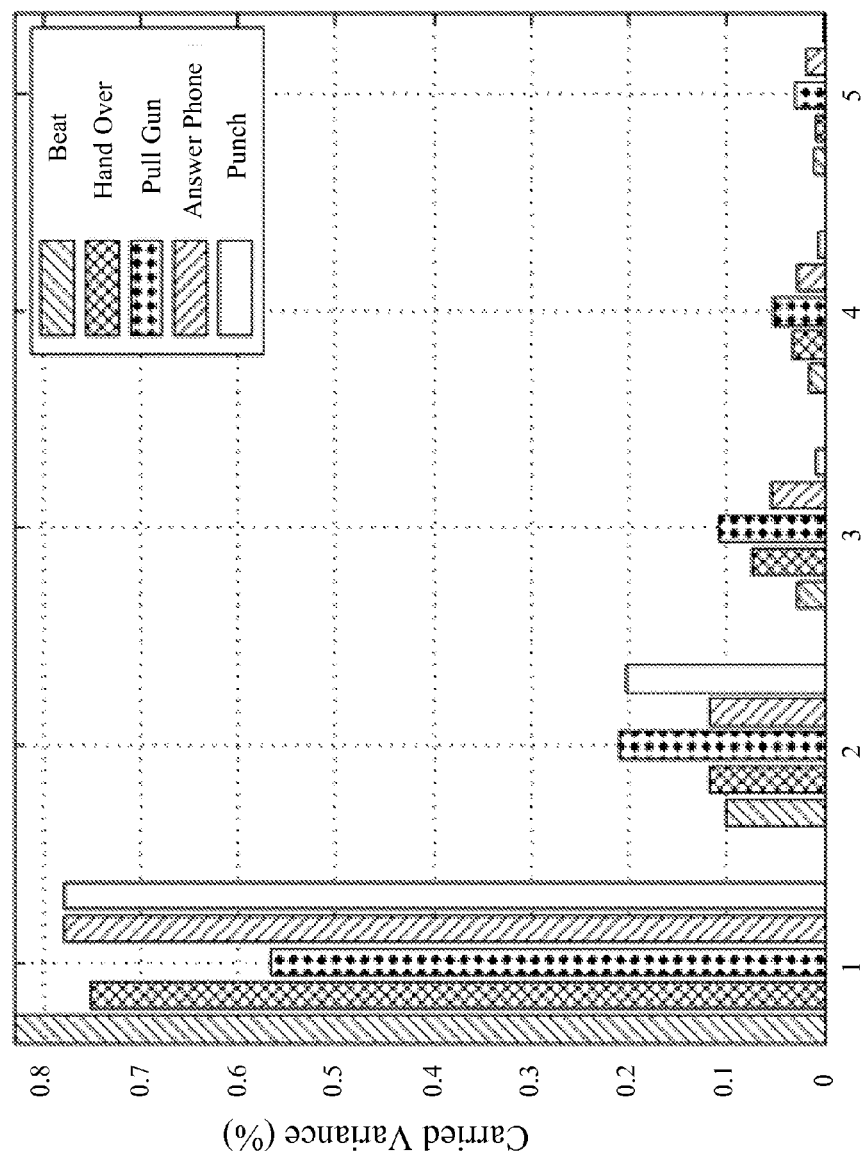
FIG. 4 illustrates representative variances carried by the first five motion harmonics for various tasks according to various embodiments of the present disclosure.
Figure 5B:
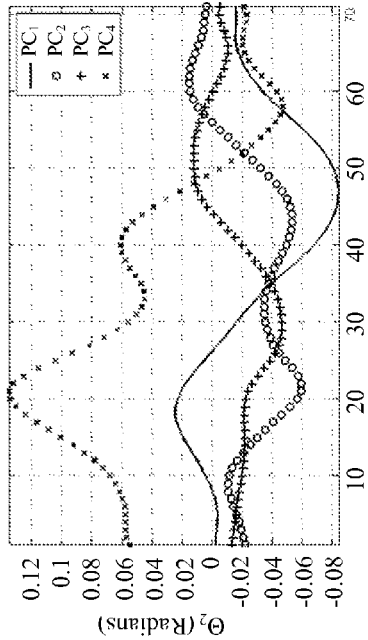
FIGS. 5A-5D illustrate the first four motion harmonics of each degree of a 'pull gun' task.
Figure 5D:
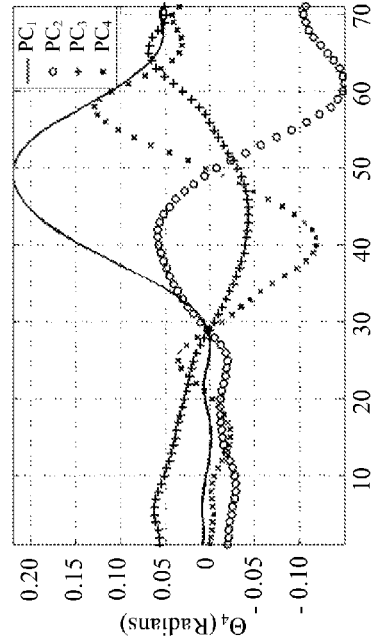
Figure 5A:
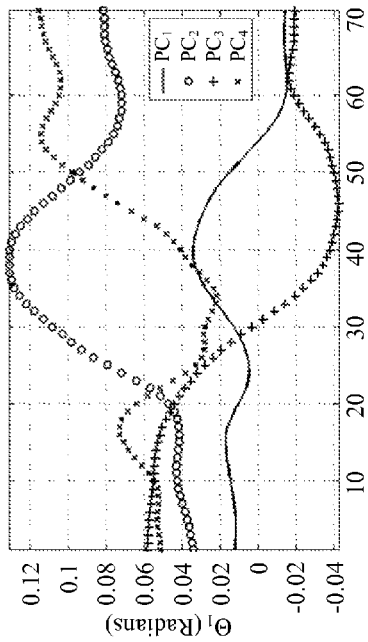
Figure 5C:
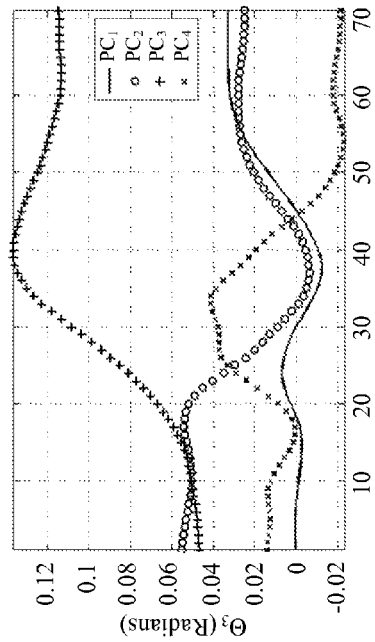
Figure 6A:
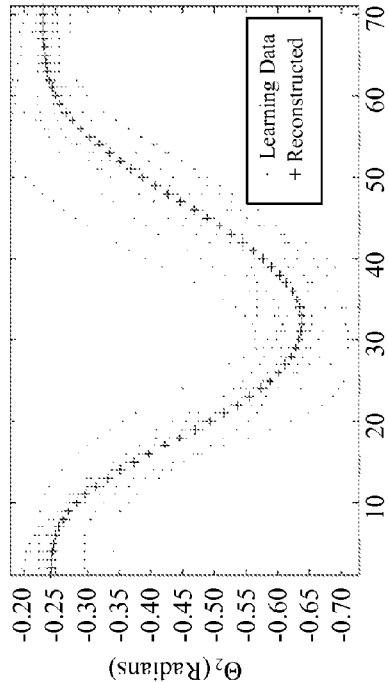
FIGS. 6A-6D illustrate the reconstruction of the mean of the 'pull gun' task in the joint space for the first four motion harmonics.
Figure 6B:
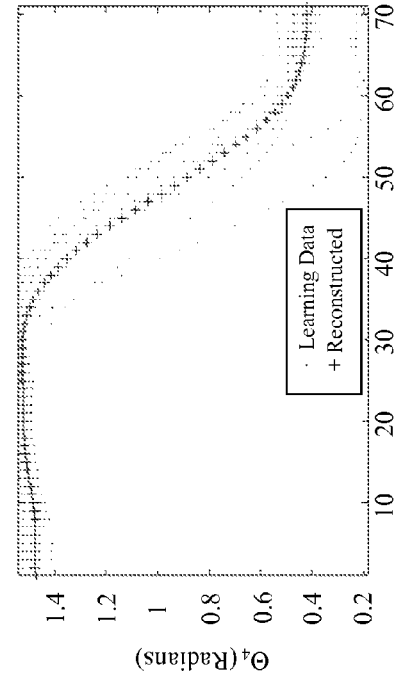
Figure 6C:
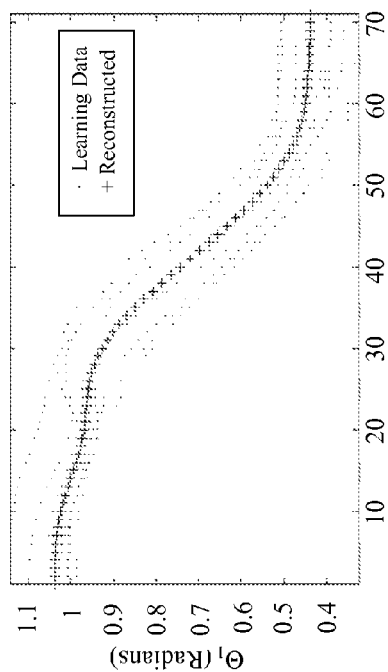
Figure 6D:
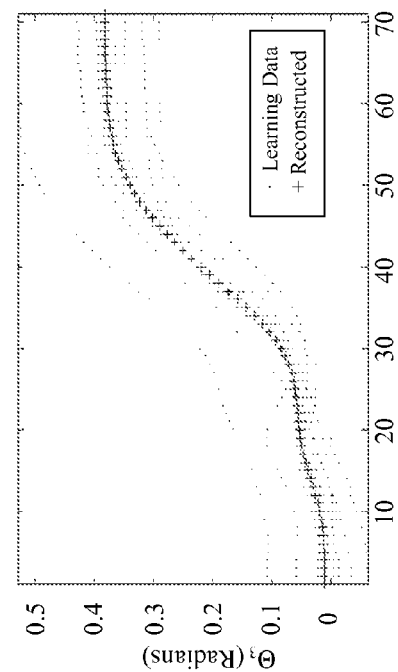

After fPCA was applied to each task separately, FIG. 4 illustrates representative variances carried by the first five motion harmonics for the tasks. It is noted that fPCA was not applied to multiple tasks at the same time because the tasks, here represented as functions, are very different. Referring to FIG. 4, even though the motion harmonics carry less than 1% of the variance, leaving it out may cause essential information to be lost. If lost, task reconstruction may fail.

Figure 7:
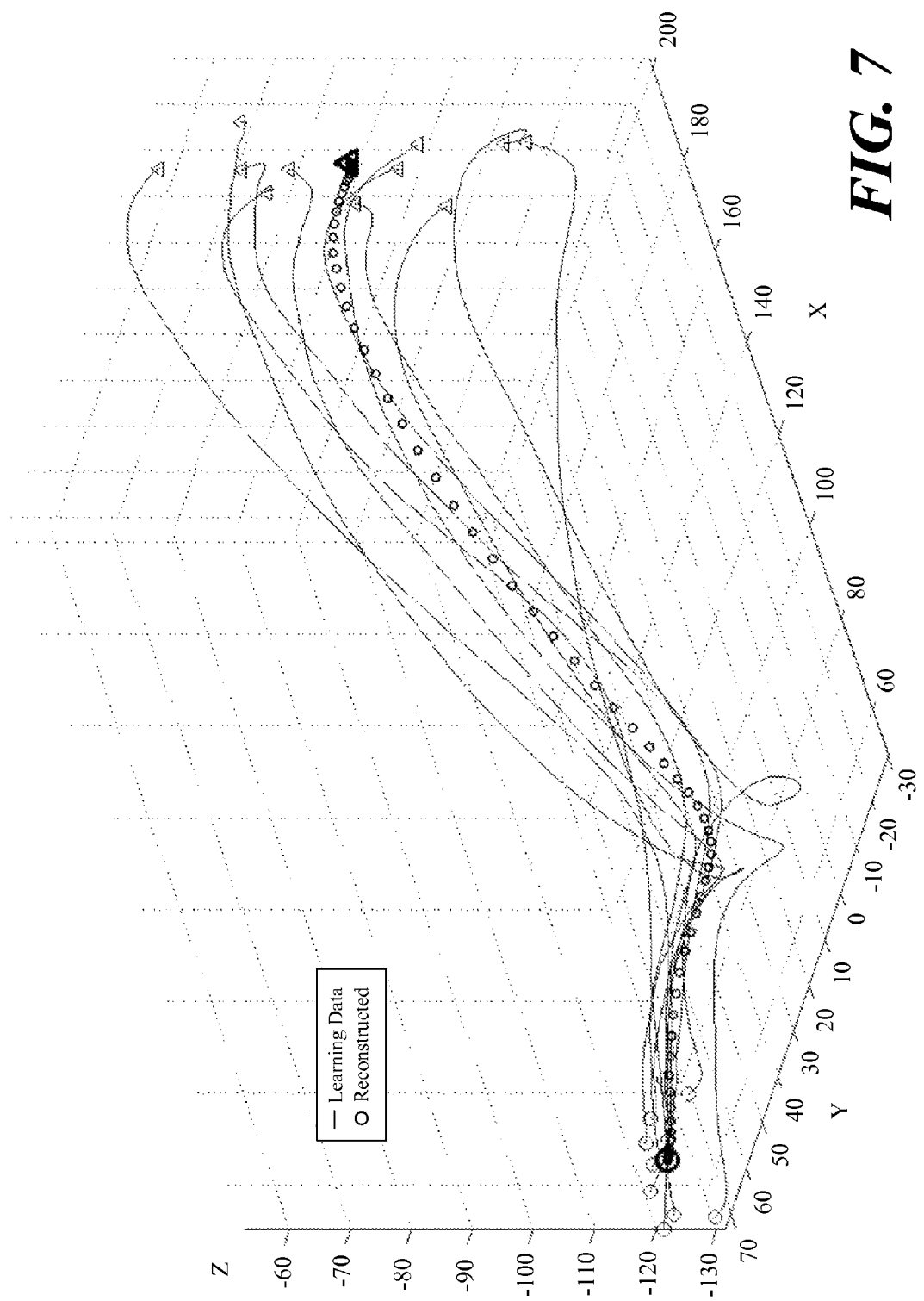
FIG. 7 illustrates the reconstruction of the mean of the 'pull gun' task in the world space.

Out of the five tasks, 'pull gun' has the least drastically distributed variance carried by its motion harmonics. Therefore, 'pull gun' was used to determine a number of harmonics for motion generation. Specifically, the first three harmonics of 'pull gun' carry 88.51% of all the variance, and the first four carry 93.74%. To cover over 90% of all the variance (so that the motion harmonics are sufficiently capable) and to keep a low number of harmonics, four harmonics were used. In this context, FIGS. 5A-5D illustrate the first four motion harmonics of each degree of a 'pull gun' task. FIGS. 6A-6D illustrate the reconstruction of the mean of the 'pull gun' task in the joint space for the first four motion harmonics. Further, FIG. 7 illustrates the reconstruction of the mean of the 'pull gun' task in the world space.

Table 3 below shows the constraints that are tested on each task, and for each task, three values of α are tested: 0.01, 10, and 500, where x' represents the transpose of x.

TABLE 3

Constraints Per Task

| Task | Constraints ({time index, translation vector}) |
|---|---|
| beat | {1, [0, 10, −5]'}, {T, [0, −10, −10]'} |
| hand over | {1, [−5, −5, 0]'}, {T/2, [0, −5, 5]'}, {T, [0, −10, 0]'} |
| pull gun | {1, [−5, 5, −10]'}, {T, [5, −10, 10]'} |
| answer phone | {60, [30, −10, 0]'}, |
| punch | {1, [0, 0, 0]'}, {T, [0, 35, −5]'} |

Figure 8:
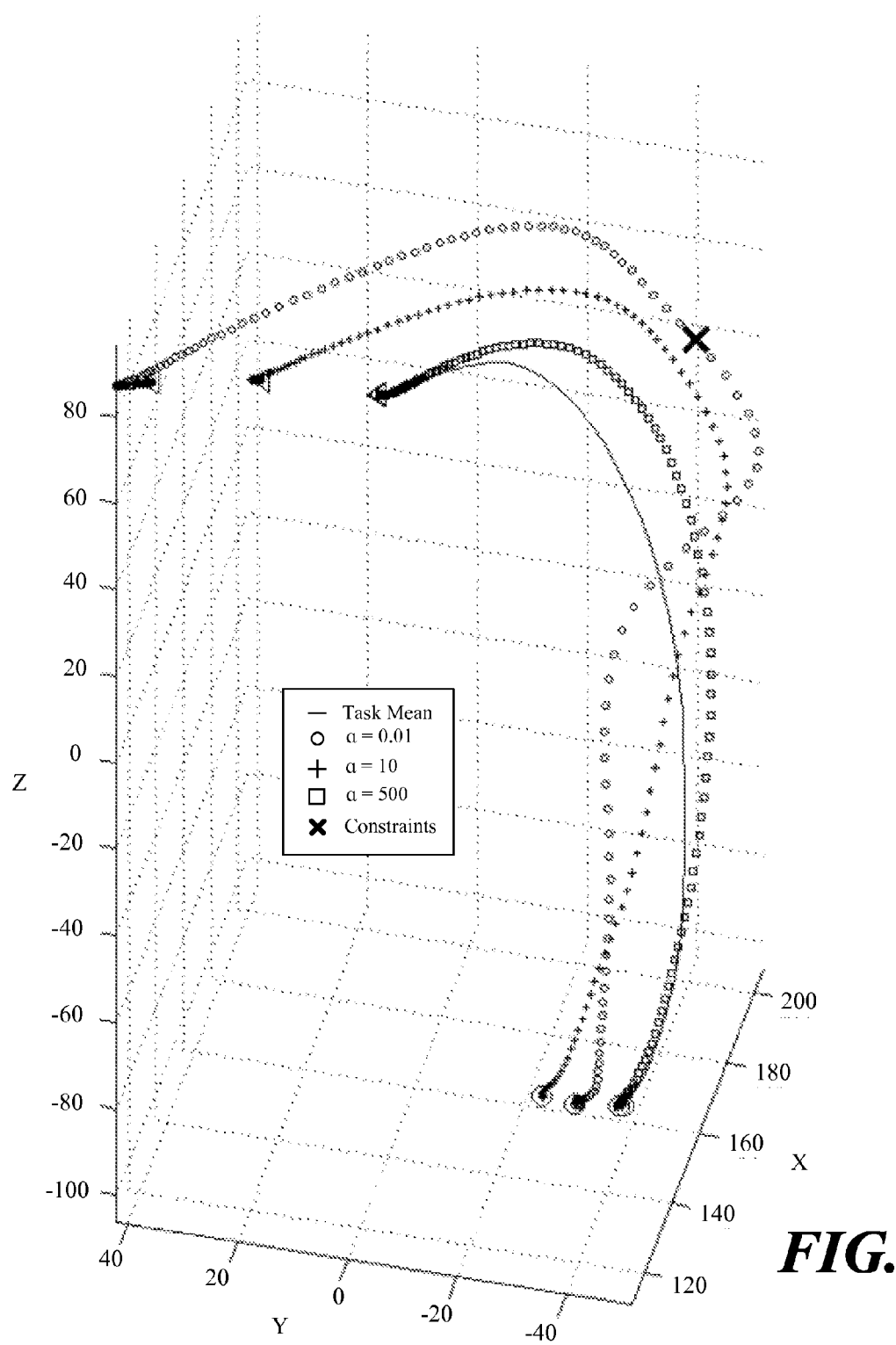
FIGS. 8-12 illustrate trajectory results of the 'pull gun,' 'beat,' 'hand over,' 'answer phone,' and 'punch' tasks, respectively.
Figure 9:
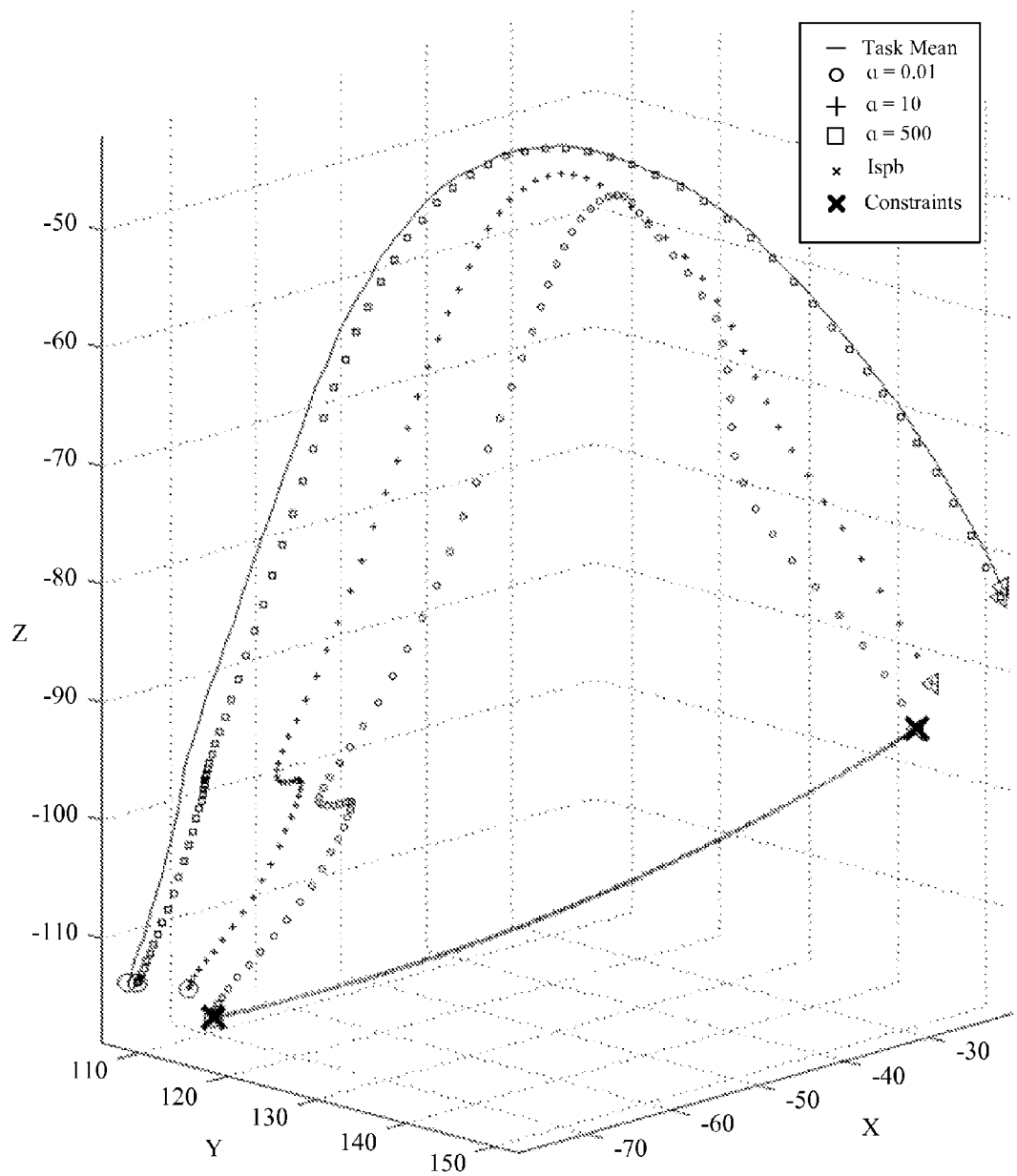
Figure 10:
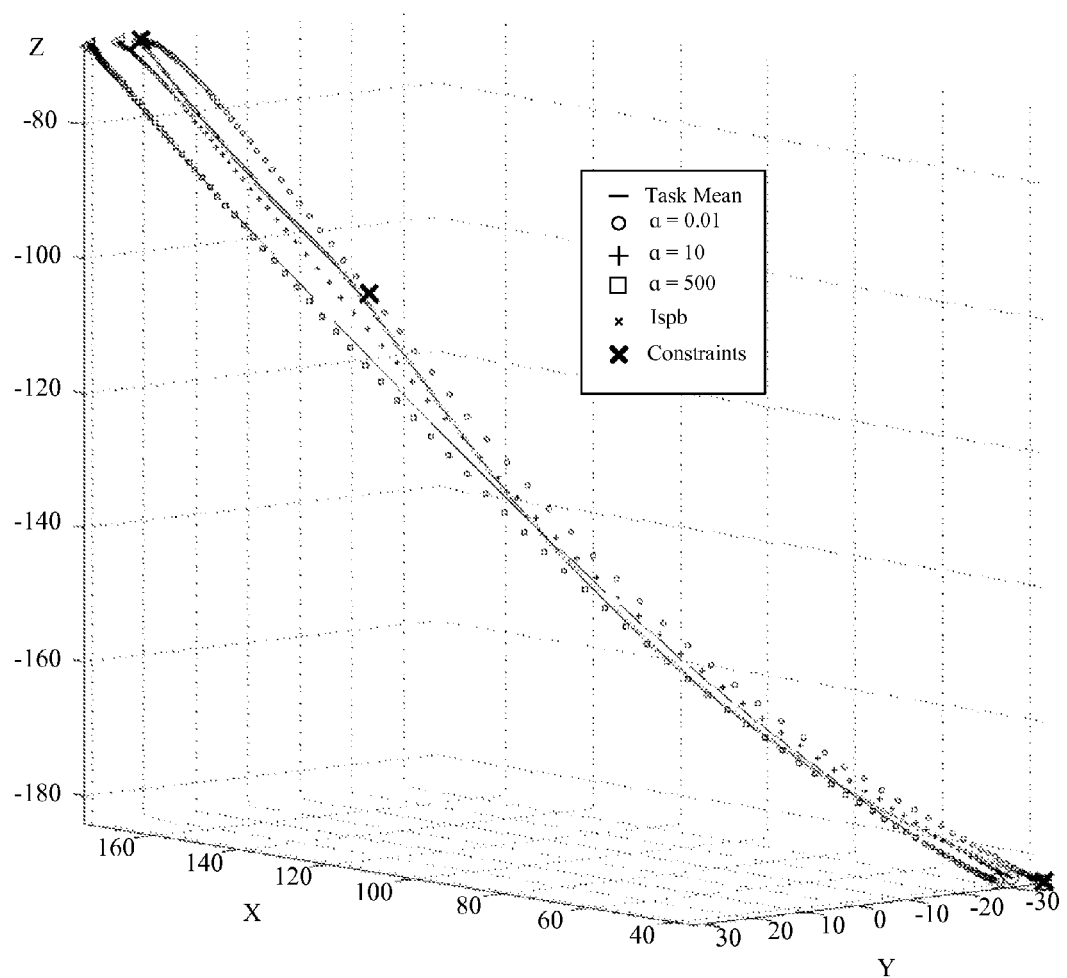
Figure 11:
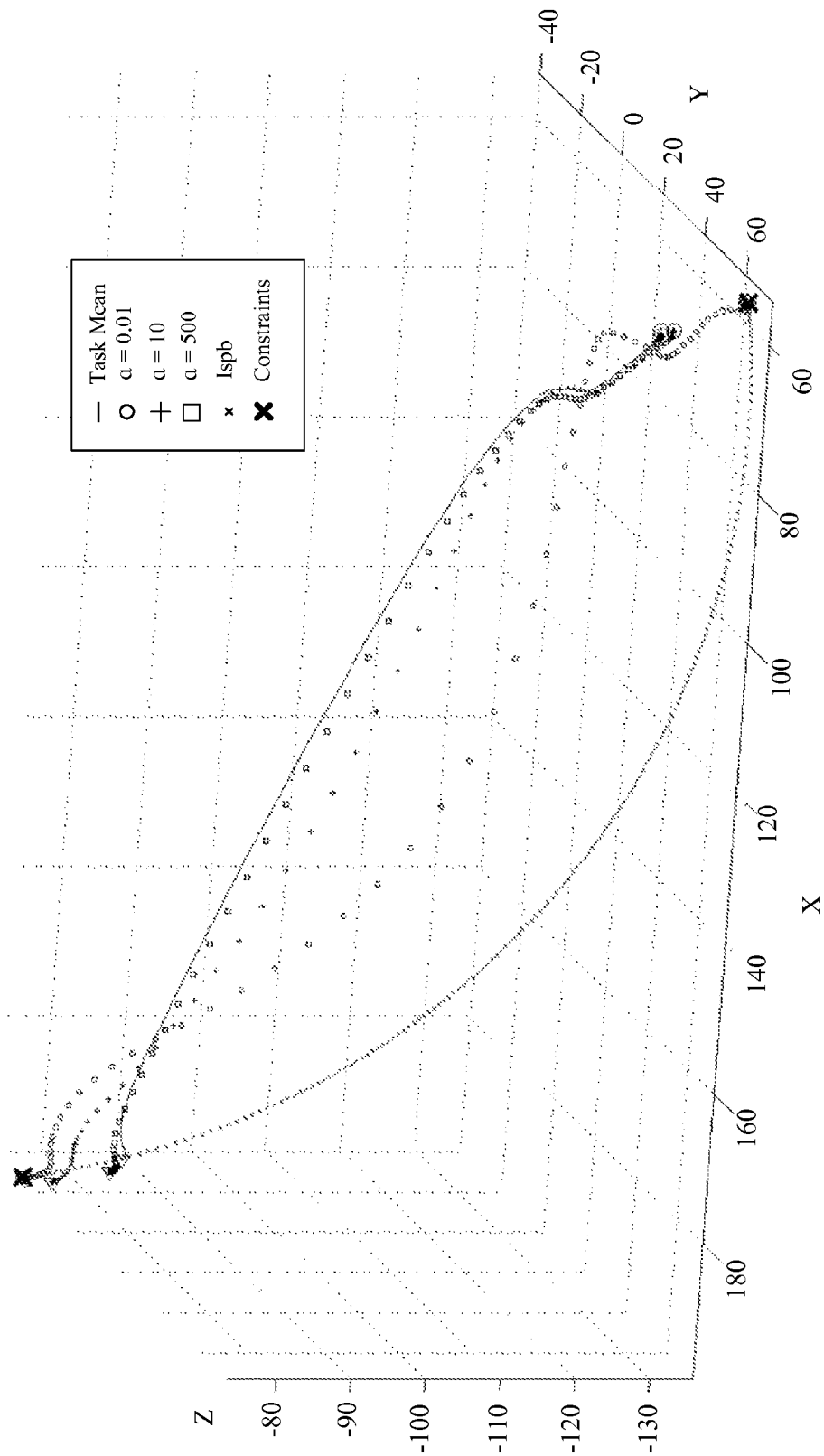
Figure 12:
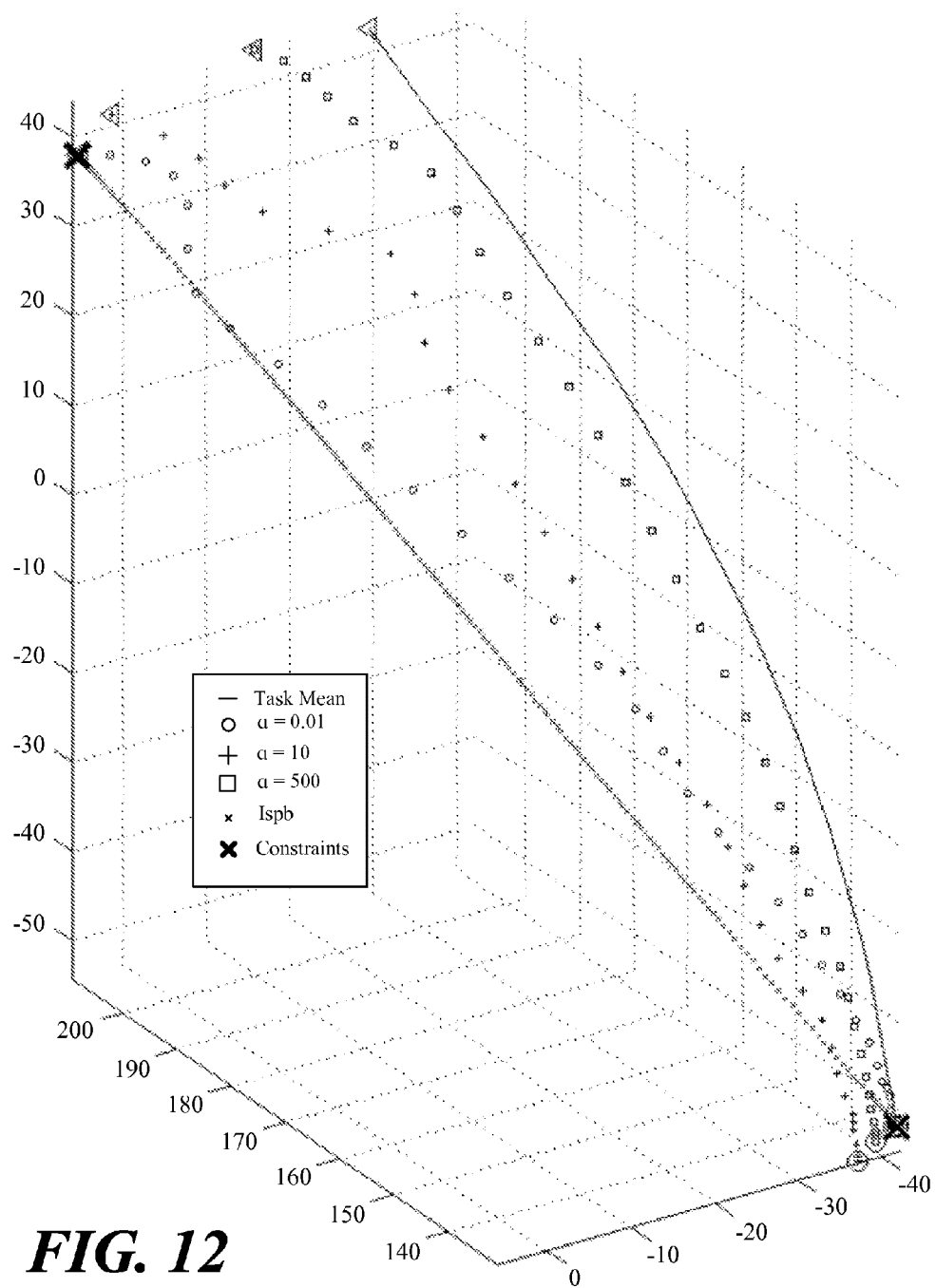

FIGS. 8-12 illustrate trajectory results of the 'pull gun,' 'beat,' 'hand over,' 'answer phone,' and 'punch' tasks, respectively. In FIGS. 8-12, a trajectory generated by linear-segment polynomial-blend (LSPB) is also illustrated for comparison. It is noted that LSPB does not have the ability to learn from data and can only interpolate between constraints to generate a trajectory. In FIG. 8, for example, three new motion trajectories are shown, each corresponding to a different value of α. At α=0.01, the new motion trajectory meets the constraints although it is distorted at both ends. At α=500, the new motion trajectory stays closer to the mean task. When α=10, between 0.01 and 500, the new motion trajectory deviates from the mean task but does not perfectly meet the constraints. A similar trend can be observed in FIGS. 9-12. Since LSPB cannot learn (only interpolate), it invariably generates simple new trajectories.

According to the embodiments, a new robotic trajectory generation algorithm may be relied upon to new robotic trajectories with adaptation to user constraints. The degree to which the constraints are satisfied may be tuned using a weight as an optimization. The algorithm may generate countless numbers of constrained motion variants without the need to learn new data.

Since the constraints play an essential role in the new motion trajectory results, when α is set so that the generation pursues the constraints, it is assumed that the constraints are meaningful. one may consults the variation observed in the data before determining the constraints for the new task, although the choice of constraints is completely free.

FIG. 13 illustrates an example schematic block diagram of a processing system 1300 that may be employed as the processing environment 100 of the system 10 in FIG. 1. The computing architecture 1300 may be embodied, in part, using one or more elements of a mixed general and/or specific purpose computer. The computing architecture 1300 includes a processor 1310, a Random Access Memory (RAM) 1320, a Read Only Memory (ROM) 1330, a memory device 1340, and an Input Output (I/O) interface 1350. The elements of computing architecture 1300 are communicatively coupled via one or more local interfaces 1302. The elements of the computing architecture 1300 are not intended to be limiting in nature, as the architecture may omit elements or include additional or alternative elements.

In various embodiments, the processor 1310 may include or be embodied as a general purpose arithmetic processor, a state machine, or an ASIC, for example. In various embodiments, the processing environment 100 in FIG. 1 may be implemented, at least in part, using a computing architecture 1300 including the processor 1310. The processor 1310 may include one or more circuits, one or more microprocessors, ASICs, dedicated hardware, or any combination thereof. In certain aspects and embodiments, the processor 1310 is configured to execute one or more software modules which may be stored, for example, on the memory device 1340. The software modules may configure the processor 1310 to perform the tasks undertaken by the elements of the computing environment 100 of the system 10 of FIG. 1A, for example. In certain embodiments, the process 200 described in connection with FIG. 2 may be implemented or executed by the processor 1310 according to instructions stored on the memory device 1340.

The RAM and ROM 1320 and 1330 may include or be embodied as any random access and read only memory devices that store computer-readable instructions to be executed by the processor 1310. The memory device 1340 stores computer-readable instructions thereon that, when executed by the processor 1310, direct the processor 1310 to execute various aspects of the embodiments described herein.

As a non-limiting example group, the memory device 1340 includes one or more non-transitory memory devices, such as an optical disc, a magnetic disc, a semiconductor memory (i.e., a semiconductor, floating gate, or similar flash based memory), a magnetic tape memory, a removable memory, combinations thereof, or any other known non-transitory memory device or means for storing computer-readable instructions. The I/O interface 1350 includes device input and output interfaces, such as keyboard, pointing device, display, communication, and/or other interfaces. The one or more local interfaces 1302 electrically and communicatively couples the processor 1310, the RAM 1320, the ROM 1330, the memory device 1340, and the I/O interface 1350, so that data and instructions may be communicated among them.

In certain aspects, the processor 1310 is configured to retrieve computer-readable instructions and data stored on the memory device 1340, the RAM 1320, the ROM 1330, and/or other storage means, and copy the computer-readable instructions to the RAM 1320 or the ROM 1330 for execution, for example. The processor 1310 is further configured to execute the computer-readable instructions to implement various aspects and features of the embodiments described herein. For example, the processor 1310 may be adapted or configured to execute the process 200 described above in connection with FIG. 2. In embodiments where the processor 1310 includes a state machine or ASIC, the processor 1310 may include internal memory and registers for maintenance of data being processed.

The flowchart or process diagram of FIG. 2 is representative of certain processes, functionality, and operations of embodiments described herein. Each block may represent one or a combination of steps or executions in a process. Alternatively or additionally, each block may represent a module, segment, or portion of code that includes program instructions to implement the specified logical function(s). The program instructions may be embodied in the form of source code that includes human-readable statements written in a programming language or machine code that includes numerical instructions recognizable by a suitable execution system such as the processor 1310. The machine code may be converted from the source code, etc. Further, each block may represent, or be connected with, a circuit or a number of interconnected circuits to implement a certain logical function or process step.

Although embodiments have been described herein in detail, the descriptions are by way of example. The features of the embodiments described herein are representative and, in alternative embodiments, certain features and elements may be added or omitted. Additionally, modifications to aspects of the embodiments described herein may be made by those skilled in the art without departing from the spirit and scope of the present invention defined in the following claims, the scope of which are to be accorded the broadest interpretation so as to encompass modifications and equivalent structures.

Disjunctive language, such as the phrase "at least one of X, Y, or Z," unless specifically stated otherwise, is used in general to present that an item, term, etc., may be either X, Y, or Z, or any combination thereof (e.g., X, Y, and/or Z). Thus, such disjunctive language is not generally intended to, and should not imply that, certain embodiments require at least one of X, at least one of Y, and at least one of Z to be each present.

Therefore, at least the following is claimed:

1. A method of generating robot trajectories, comprising:
    gathering human motion trajectories in a first workspace;
    adapting, by at least one computing device, the human motion trajectories from the first workspace into robot-reachable motion trajectories in a second workspace based on a joint space of a robot model;
    generating, by the at least one computing device, motion harmonics with reference to the robot-reachable motion trajectories using functional principal component analysis;
    specifying at least one constraint for a new goal;
    searching, by the at least one computing device, weights of the motion harmonics to identify a new motion trajectory to reduce discrepancy from the human motion trajectories and error due to the at least one constraint; and
    directing, by the at least one computing device, a robot to move according to the new motion trajectory.

2. The method of claim 1, wherein searching the weights of the motion harmonics comprises balancing the discrepancy from the human motion trajectories with the error due to the at least one constraint based on a weighting factor to identify the new motion trajectory.

3. The method of claim 2, wherein searching the weights of the motion harmonics comprises searching the weights using a sequential quadratic programming algorithm.

4. The method of claim 1, wherein adapting the human motion trajectories comprises iteratively adapting the human motion trajectories from the first workspace into the robot-reachable motion trajectories in the second workspace based on the joint space of the robot model.

5. The method of claim 4, wherein iteratively adapting the human motion trajectories comprises iteratively scaling the human motion trajectories from the first workspace into the robot-reachable motion trajectories in the second workspace based on the joint space of the robot model.

6. The method of claim 1, wherein the first workspace comprises a human configuration space and the second workspace comprises a robot configuration space.

7. The method of claim 1, wherein adapting the human motion trajectories into the robot-reachable motion trajectories comprises converting kinematics of the human motion trajectories to kinematics of the robot model.

8. The method of claim 1, wherein the constraints comprise at least one of a joint space constraint of a robot, a velocity profile constraint of the robot, and a physical constraint on a trajectory.

9. A system for generating robot trajectories, comprising:
    a memory device configured to store computer-readable instructions thereon; and
    at least one computing device configured, through execution of the computer-readable instructions, to:
        adapt a human motion trajectory from a first workspace into a robot-reachable motion trajectory in a second workspace;
        generate motion harmonics with reference to the robot-reachable motion trajectory;
        search weights of the motion harmonics and identify a new motion trajectory to reduce discrepancy from the human motion trajectory and error due to at least one constraint; and
        direct a robot to move according to the new motion trajectory.

10. The system of claim 9, wherein the at least one computing device is further configured to generate the motion harmonics using functional principal component analysis.

11. The system of claim 9, wherein the at least one computing device is further configured to balance the discrepancy from the human motion trajectory with the error due to the at least one constraint based on a weighting factor.

12. The system of claim 9, wherein the at least one computing device is further configured to adapt the human motion trajectory into the robot-reachable motion trajectory based on a joint space of a robot model.

13. The system of claim 12, wherein the at least one computing device is further configured to iteratively scale the human motion trajectories from the first workspace into the robot-reachable motion trajectories in the second workspace based on a joint space of the robot model.

14. The system of claim 9, wherein the first workspace comprises a human configuration space and the second workspace comprises a robot configuration space.

15. The system of claim 9, wherein the at least one computing device is further configured convert kinematics of the human motion trajectories to kinematics of a robot model.

16. The system of claim 9, wherein the constraints comprise at least one of a joint space constraint of a robot, a velocity profile constraint of the robot, and a physical constraint on a trajectory.

17. A method of generating robot trajectories, comprising:
adapting, by at least one computing device, human motion trajectories from a first workspace into robot-reachable motion trajectories in a second workspace;
generating, by the at least one computing device, motion harmonics with reference to the robot-reachable motion trajectories;
specifying at least one constraint for a new goal;
searching, by the at least one computing device, weights of the motion harmonics to identify a new motion trajectory to reduce error due to the at least one constraint and discrepancy from at least one of the human motion trajectories or the robot-reachable motion trajectories; and
directing, by the at least one computing device, a robot to move according to the new motion trajectory.

18. The method of claim 17, further comprising directing a robot to move according to the new motion trajectory.

19. The method of claim 17, wherein searching the weights of the motion harmonics comprises balancing the discrepancy from the human motion trajectories with the error due to the at least one constraint based on a weighting factor to identify the new motion trajectory.

20. The method of claim 1, wherein adapting the human motion trajectories comprises iteratively scaling the human motion trajectories from the first workspace into the robot-reachable motion trajectories in the second workspace based on a joint space of the robot model.

* * * * *